(12) United States Patent
Kowada

(10) Patent No.: US 8,245,504 B2
(45) Date of Patent: Aug. 21, 2012

(54) EXHAUST EMISSION CONTROL DEVICE

(75) Inventor: Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 287 days.

(21) Appl. No.: 12/738,994

(22) PCT Filed: Oct. 22, 2008

(86) PCT No.: PCT/JP2008/002983
§ 371 (c)(1),
(2), (4) Date: Apr. 21, 2010

(87) PCT Pub. No.: WO2009/054123
PCT Pub. Date: Apr. 30, 2009

(65) Prior Publication Data
US 2010/0257849 A1   Oct. 14, 2010

(30) Foreign Application Priority Data
Oct. 23, 2007   (JP) .................................. 2007-274566

(51) Int. Cl.
*F01N 3/24* (2006.01)
(52) U.S. Cl. ............................... 60/295; 60/297; 60/317
(58) Field of Classification Search .................... 60/295, 60/297, 301, 317
See application file for complete search history.

(56) References Cited

U.S. PATENT DOCUMENTS

| | | | |
|---|---|---|---|
| 2009/0313979 A1 | 12/2009 | Kowada | |
| 2010/0000203 A1 | 1/2010 | Kowada | |
| 2010/0132333 A1 | 6/2010 | Endo et al. | |
| 2010/0132348 A1 | 6/2010 | Kowada | |

FOREIGN PATENT DOCUMENTS

| | | | |
|---|---|---|---|
| GB | 2381218 A | * | 4/2003 |
| JP | 2000 240436 | | 9/2000 |
| JP | 2004 108221 | | 4/2004 |
| JP | 2005 155404 | | 6/2005 |

(Continued)

OTHER PUBLICATIONS

U.S. Appl. No. 12/994,381, filed Nov. 23, 2010, Kowada.
Supplementary European Search Report issued May 13, 2011, in Patent Application No. EP 08 84 2016.
U.S. Appl. No. 12/742,321, filed May 11, 2010, Kowada, et al.
U.S. Appl. No. 12/676,056, filed Mar. 2, 2010, Kowada.

(Continued)

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An object of the invention is to provide an exhaust emission control device which eliminates the use of a heat-retention structure using heat-insulating material such as glass wool so as to attain substantial lessening in production cost. A discharge end of a gas gathering chamber is connected to an entry end of a mixing pipe so as to encase the entry end of the mixing pipe and close an opened end face in a required spaced-apart relationship. Moreover, a side surface of the entry end of the mixing pipe adjacent to the discharge side of the particulate filter is formed with an opening; and gas guide passages are formed in the gas gathering chamber by guide fins for tangential introduction of all of the exhaust gas from the discharge side of the particulate filter to the opening. An extra space isolated from the gas guide passages is ensured in the gas gathering chamber as a heat-retention chamber surrounding the entry end of the mixing pipe.

2 Claims, 7 Drawing Sheets

FOREIGN PATENT DOCUMENTS

| | | |
|---|---|---|
| JP | 2005 214175 | 8/2005 |
| JP | 2007 40224 | 2/2007 |
| JP | 2008-196328 | 8/2008 |
| JP | 2008 208726 | 9/2008 |
| WO | WO 03/025356 A1 * | 3/2003 |
| WO | WO 2004/033866 A1 | 4/2004 |

OTHER PUBLICATIONS

U.S. Appl. No. 12/678,941, filed Mar. 18, 2010, Endo, et al.
U.S. Appl. No. 12/674,106, filed Feb. 18, 2010, Kimura.
U.S. Appl. No. 12/677,957, filed Mar. 12, 2010, Kowada, et al.
U.S. Appl. No. 12/679,677, filed Mar. 24, 2010, Kowada.

* cited by examiner

EXHAUST EMISSION CONTROL DEVICE

TECHNICAL FIELD

The present invention relates to an exhaust emission control device.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the selective reduction catalyst and the particulate filter, thereby attaining lessening of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a urea water added position and the selective reduction catalyst. However, such arrangement of the particulate filter and the selective reduction catalyst substantially spaced apart from each other will extremely impair the mountability on a vehicle.

In order to overcome this, a compact exhaust emission control device as shown in FIGS. 1 and 2 has been proposed by the inventor as Japanese patent application No. 2007-29923. In the exhaust emission control device of the prior application shown, incorporated in an exhaust pipe 4 through which exhaust gas 3 flows from a diesel engine 1 via an exhaust manifold 2 is a particulate filter 5 housed in a casing 7 to capture particles in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. A discharge end of the particulate filter 5 is connected to an entry end of the selective reduction catalyst 6 through an S-shaped communication passage 9 such that the exhaust gas 3 discharged through the discharge end of the particulate filter 5 is reversely curved back into the entry end of the adjacent selective reduction catalyst 6.

As shown in FIG. 2 which shows substantial parts in enlarged scale, the communication passage 9 is the S-shaped structure comprising a gas gathering chamber 9A which encircles the discharge end of the particulate filter 5 to gather the exhaust gas 3 just discharged from the discharge end of the particulate filter 5 through substantially perpendicular turnabout of the gas, a mixing pipe 9B which extracts the gathered exhaust gas 3 from the chamber 9A in a direction reverse to the flow of the exhaust in the particulate filter 5 and which is provided with a urea water addition injector 11 (urea water addition means) intermediately of the mixing pipe and a gas dispersing chamber 9C which encircles the entry end of the selective reduction catalyst 6 so as to disperse the gas 3 guided by the mixing pipe 9B through substantially perpendicular turnabout of the gas into the entry end of the selective reduction catalyst 6.

Arranged in the casing 7 and in front of the particulate filter 5 is an oxidation catalyst 14 for oxidization treatment of unburned fuel in the exhaust gas 3, and arranged in the casing 8 and behind the selective reduction catalyst 6 is an ammonia lessening catalyst 15 for oxidization treatment of surplus ammonia.

With such construction being employed, particulates in the exhaust gas 3 are captured by the particulate filter 5. The urea water is added intermediately of the mixing pipe 9B and downstream of the filter into the exhaust gas 3 by the injector 11 and is pyrolyzed into ammonia and carbon dioxide gas, so that $NO_x$ in the exhaust gas 3 is favorably reduced and departed by the ammonia on the selective reduction catalyst 6. As a result, both the particulates and $NO_x$ in the exhaust gas 3 are lessened.

In this case, the exhaust gas 3 discharged through the discharge end of the particulate filter 5 is reversely curved back by the communication passage 9 into the entry end of the adjacent selective reduction catalyst 6. As a result, enough reaction time is ensured for production of ammonia from the urea water since a long distance between the urea water added position intermediately of the communication passage 9 and the selective reduction catalyst 6 is ensured and the flow of the exhaust gas 3 becomes turbulent due to the reversed curving to facilitate mixing of the urea water with the exhaust gas 3.

Moreover, the particulate filter 5 and selective reduction catalyst 6 are arranged in parallel with each other and the communication passage 9 is arranged between and along the particulate filter 5 and selective reduction catalyst 6, so that the whole structure becomes compact in size to substantially enhance its mountability on a vehicle.

Where the addition of the urea water to the selective reduction catalyst 6 is to conducted between the particulate filter 5 and the catalyst 6 as illustrated in FIGS. 1 and 2 and mentioned in the above, the mixing pipe 9B is provided midway with a boss 10 branching slantingly to upstream side. Fitted from outside of the mixing pipe 9B into the boss 10 is a urea water addition injector 11. With the injector 11 protected so as not to be directly exposed to the flow of the hot exhaust gas 3, urea water is added so that, where the exhaust gas 3 has increased flow rate as shown in FIG. 3, the urea water added by the injector 11 is forced by the vigorous flow of the exhaust gas 3 to be biased along an inner wall of the mixing pipe 9B, disadvantageously failing in sufficient dispersion of the urea water.

Then, the inventor devised out as shown in FIGS. 4 and 5 that a side surface of the entry end of the mixing pipe 9B adjacent to the discharge end of the particulate filter 5 is formed with an opening 12. Gas guide passages 13 for introduction of all of the exhaust gas 3 from the discharge end of the particulate filter 5 tangentially into the opening 12 are formed, using guide fins 16a and 16b and a part of the discharge end of the gas gathering chamber 9A. A urea water addition injector 11 is coaxially fitted to an entry end face of the mixing pipe 9B so as to add the urea water axially of the entry end of the mixing pipe 9B.

Specifically, in this manner, the exhaust gas 3 tangentially flows into the opening 12 to make a spiral flow in the mixing pipe 9B, which facilitates dispersion of the urea water axially added to the entry end face of the mixing pipe 9B by the urea water addition injector 11 and facilitates collision of the urea water against an inner periphery of the mixing pipe 9B; as a result, mist particles of the urea water are effectively miniaturized and early decomposed into ammonia and carbon dioxide gas.

As a prior art literature pertinent to the invention, there already exists, for example, the following Patent Literature 1.
[Patent Literature 1] JP 2005-155404A

SUMMARY OF INVENTION

Technical Problems

However, with the above-mentioned structure as shown in FIGS. 4 and 5 being employed, when the inner periphery of the entry end of the mixing pipe 9B against which the urea water collides is cold, the colliding urea water tends to deposit as solid urea without decomposition into ammonia. In order to overcome this, an outer periphery of the discharge end of the gas gathering chamber 9A must be covered with heat-insulating material 17 such as glass wool to attain sufficient heat retention. A heat-retention structure using such heat-insulating material 17 has been a factor of high rise in production cost.

The invention was made in view of the above and has its object to provide an exhaust emission control device which eliminates the use of a heat-retention structure using heat-insulating material such as glass wool to attain substantial lessening in production cost.

Solution to Problems

The invention is directed to an exhaust emission control device comprising a particulate filter, a selective reduction catalyst arranged downstream of the particulate filter and capable of selectively reacting $NO_x$ with ammonia even in the presence of oxygen and a communication passage for introduction of exhaust gas from a discharge side of the particulate filter to an entry side of the selective reduction catalyst, an upstream portion of said communication passage being constituted by a gas gathering chamber for surrounding a discharge end of the particulate filter to gather the exhaust gas from said discharge end through substantial perpendicular turnabout of the gas and a mixing pipe for extracting the gathered exhaust gas from said gas gathering chamber again through substantial perpendicular turnabout of the gas, urea water being addible axially of the entry end of the mixing pipe, characterized in that a discharge end of the gas gathering chamber is connected to the entry end of the mixing pipe so as to encase the entry end of the mixing pipe and close an opened end face of said entry end in a spaced-apart relationship, an opening being formed at an appropriate position on the entry end of said mixing pipe adjacent to the discharge side of the particulate filter, gas guide passages for tangential introduction of all of the exhaust gas from the discharge side of the particulate filter to said opening being formed in said gas gathering chamber by guide fins, an extra space isolated from said gas guide passages being ensured in said gas gathering chamber as a heat-retention chamber surrounding the entry end of the mixing pipe.

Thus, in this manner, the exhaust gas from the discharge end of the particulate filter is gathered in the gas gathering chamber through substantially perpendicular turnabout of the gas and is extracted by mixing pipe again through substantially perpendicular turnabout of the gas. In this case, the exhaust gas is tangentially introduced into the opening formed on the entry end of the mixing pipe to make a swirling flow in the mixing pipe, which facilitates dispersion of the urea water added axially into the entry end of the mixing pipe and facilitates collision of the urea water against the inner periphery of the mixing pipe; as a result, mist particles of the urea water are effectively miniaturized and early decomposed into ammonia and carbon dioxide gas.

Moreover, portions other than the opening on the entry end of the mixing pipe is surrounded by the heat-retention chamber so that heat release to outside is significantly suppressed. As a result, the inner periphery of the entry end of the mixing pipe is kept high-temperatured, and the colliding urea water is prevented from depositing as solid urea without decomposition into ammonia.

It is preferable in the invention that the entry end of the mixing pipe is circumferentially cut in to provide a U-shaped notch line and an rectangular portion defined by the notch line is bent radially outward to provide the opening, the bent rectangular portion being employed as a mostdownstream guide fin for tangential introduction of the exhaust gas from the discharge side of the particulate filter to the opening.

Thus, in this manner, any step formed by attachment of a mostdownstream guide fin as separate part to an edge of the opening is eliminated and a guide surface of the mostdownstream guide fin is made contiguous with the inner periphery of the mixing pipe, so that deviations on performance such as swirling flow strength and/or exhaust resistance associated with deviation in assembling accuracy is lessened. Assembling efficiency is also enhanced in comparison with a case where the fin is attached as separate part.

Advantageous Effects of Invention

According to the above-mentioned exhaust emission control device of the invention, various effects and advantages may be obtained as follows.

(I) A swirling flow is effectively formed in the entry end of the mixing pipe and the urea water is added to the swirling flow formed, which facilitates dispersion of the urea water and facilitates collision of the urea water against the inner periphery of the mixing pipe; as a result, mist particles of the urea water can be effectively miniaturized and early decomposed into ammonia and carbon dioxide gas. Moreover, without the outer periphery of the discharge end of the gas gathering chamber being covered with heat-insulating material such as glass wool, only by ensuring the extra space isolated from the gas guide passages in the gas gathering chamber as the heat-retention chamber surrounding the entry end of the mixing pipe, the inner periphery of the entry end of the mixing pipe can be kept high-temperatured and the colliding urea water can be favorably decomposed into ammonia without deposition as solid urea; as a result, the use of a costly heat-retention structure using heat-insulating material such as glass wool can be eliminated to attain substantial lessening in production cost.

(II) By circumferentially cutting in the entry end of the mixing pipe to provide the U-shaped notch line, by bending the rectangular portion defined by the notch line radially outward to provide the opening, and by employing the bent rectangular portion as the mostdownstream guide fin for tangential introduction of the exhaust gas from the discharge side of the particulate filter to the opening, any step formed by attachment of a mostdownstream guide fin as separate part to the edge of the opening can be eliminated and the guide surface of the guide fin can be made contiguous with the inner periphery of the mixing pipe. As a result, deviations on performance such as swirling flow strength and/or exhaust resistance associated with deviation in assembling accuracy can be lessened. Furthermore, assembling efficiency can be also enhanced in comparison with a case where the mostdownstream guide fin is attached as separate part to the edge of the opening.

Figure 1:
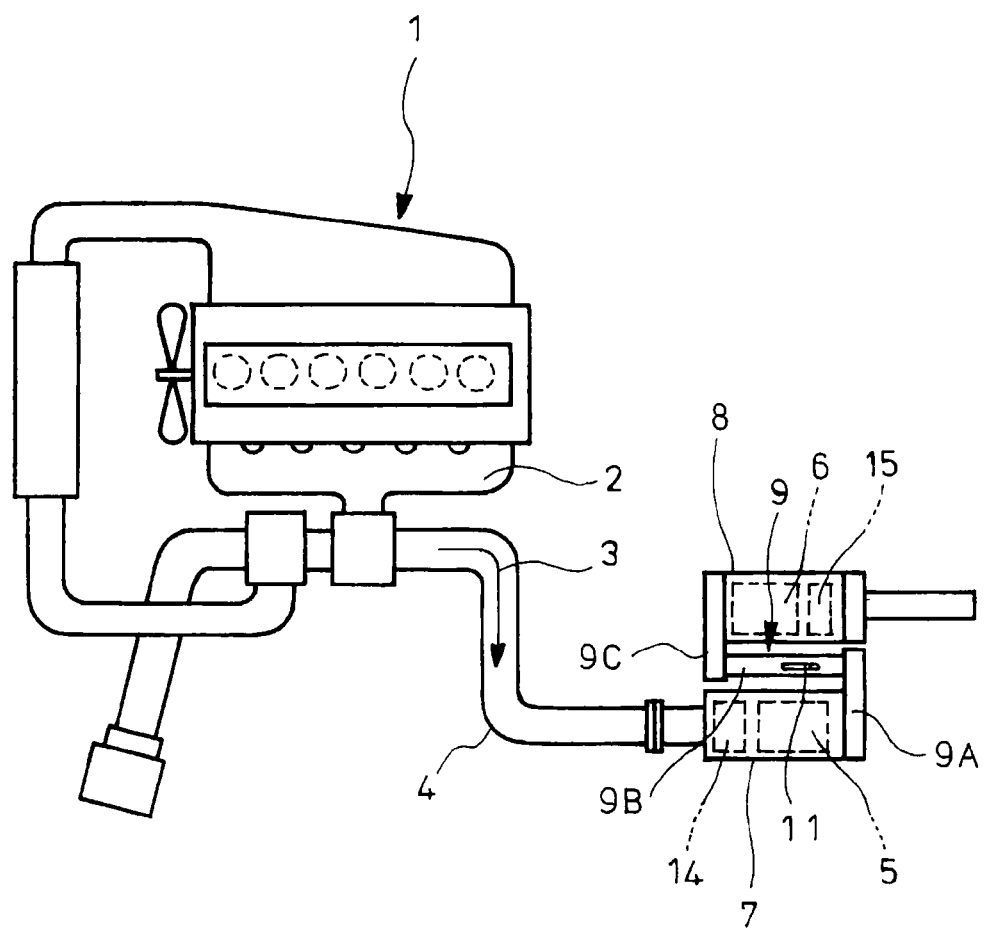
FIG. 1 is a schematic view showing a conventional device.

REFERENCE SIGNS LIST 3 exhaust gas
5 particulate filter
6 selective reduction catalyst
9 communication passage
9A gas gathering chamber
9B mixing pipe
11 urea water addition injector (urea water addition means)
12 opening
13 gas guide passage
16a guide fin
16b guide fin
16c guide fin
18 heat-retention chamber
x notch line

DESCRIPTION OF EMBODIMENTS

Embodiments of the invention will be described in conjunction with the drawings.

Figure 2:
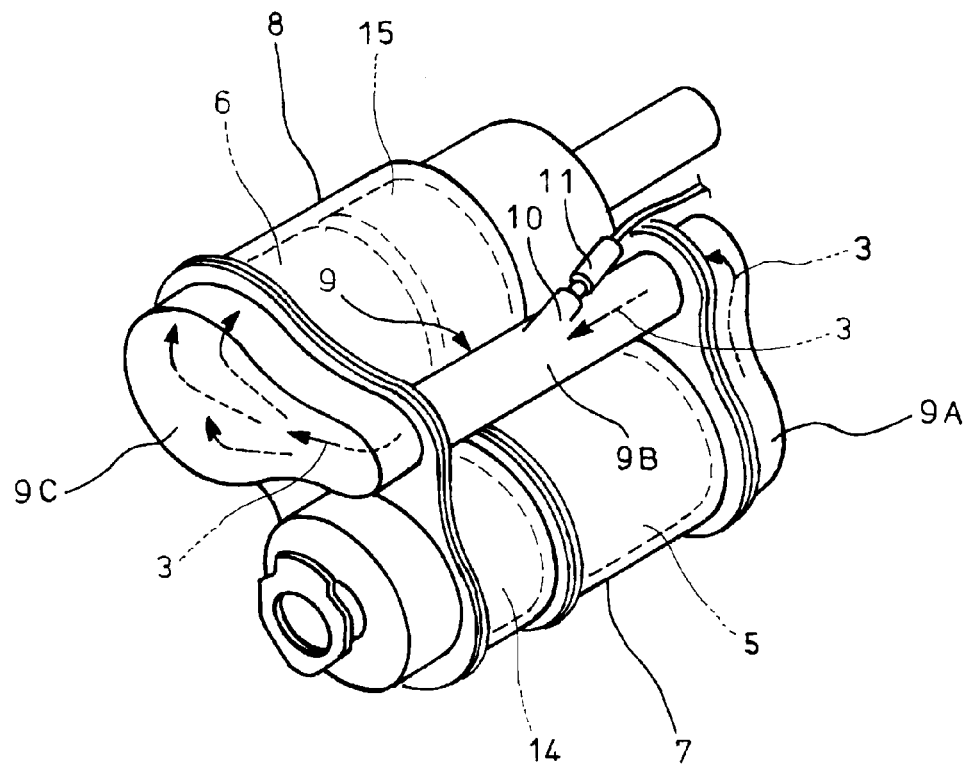
FIG. 2 is a perspective view showing substantial portions in FIG. 1 in enlarged scale.
Figure 3:
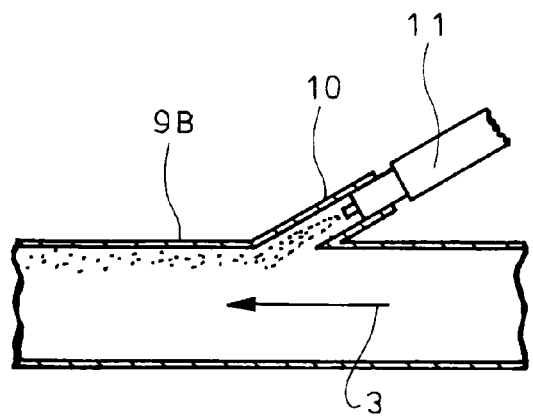
FIG. 3 is a sectional view for explanation of a problem in conventional urea water addition.
Figure 6:
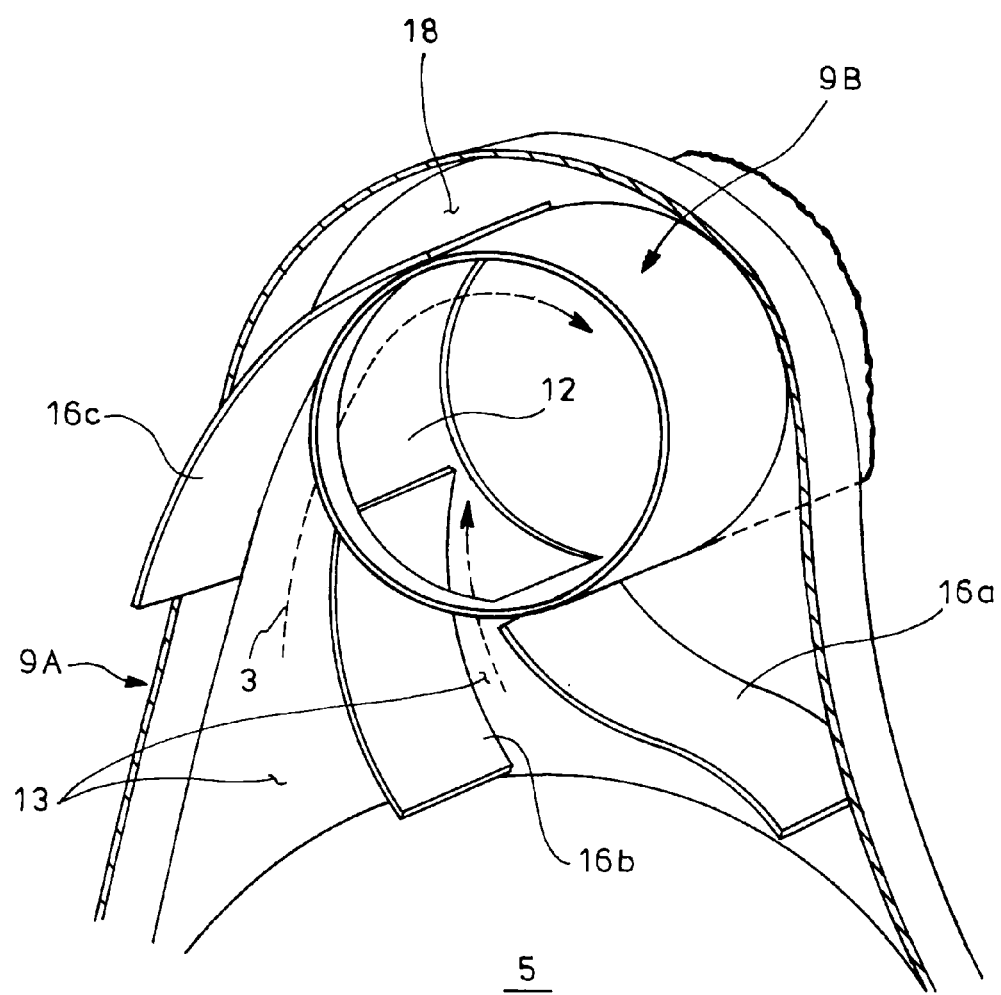
FIG. 6 is a perspective view showing partly in cutout an embodiment of the invention.
Figure 7:
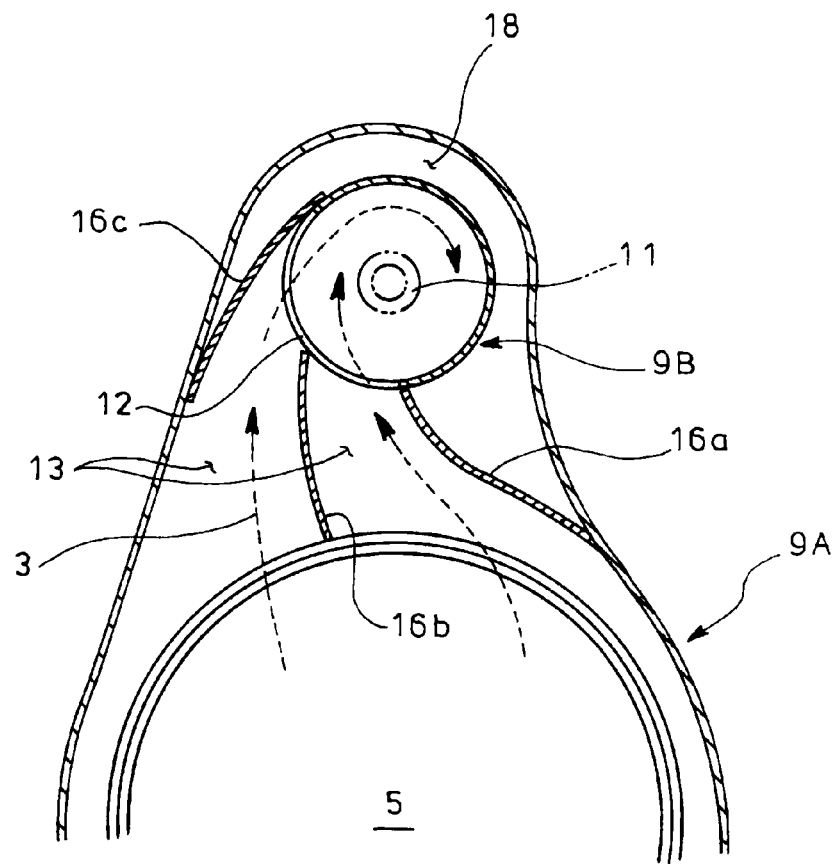
FIG. 7 is a sectional view looking the device shown in FIG. 6 in a direction opposed to the entry end of the mixing pipe.

FIGS. 6 and 7 show an embodiment of the invention directed to an exhaust emission control device which has a basic structure substantially similar to that of the above-mentioned exhaust emission control device shown in FIGS. 1 and 2 and which has changes as mentioned in the below as to an upstream portion of a communication passage 9 constituted by a gas gathering chamber 9A and a mixing pipe 9B.

Specifically, in the embodiment illustrated, a discharge end of the gas gathering chamber 9A is connected to an entry end of the mixing pipe 9B so as to encase the entry end of the mixing pipe 9B and close an opened end face of the entry end in a required spaced-apart relationship. A side surface of the entry end of the mixing pipe 9B adjacent to the discharge side of the particulate filter 5 is formed with an opening 12. Gas guide passages 13 are formed in the gas gathering chamber 9A by guide fins 16a, 16b and 16c for tangential introduction of all of the exhaust gas 3 from the discharge side of the particulate filter 5 into the opening 12. An extra space isolated from the gas guide passages 13 is ensured in the gas gathering chamber 9A as a heat-retention chamber 18 surrounding the entry end of the mixing pipe 9B.

Figure 4:
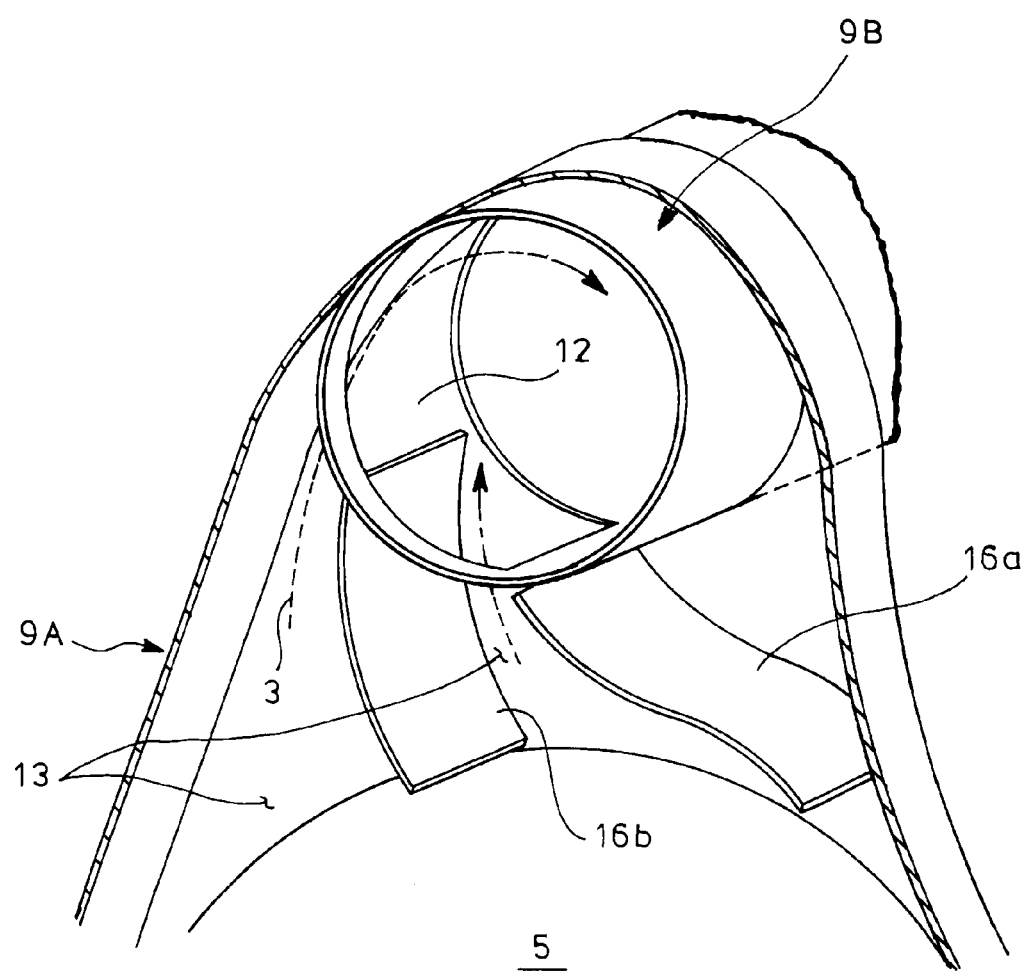
FIG. 4 is a perspective view showing partly in cutout a further conventional device proposed by the inventor.
Figure 5:
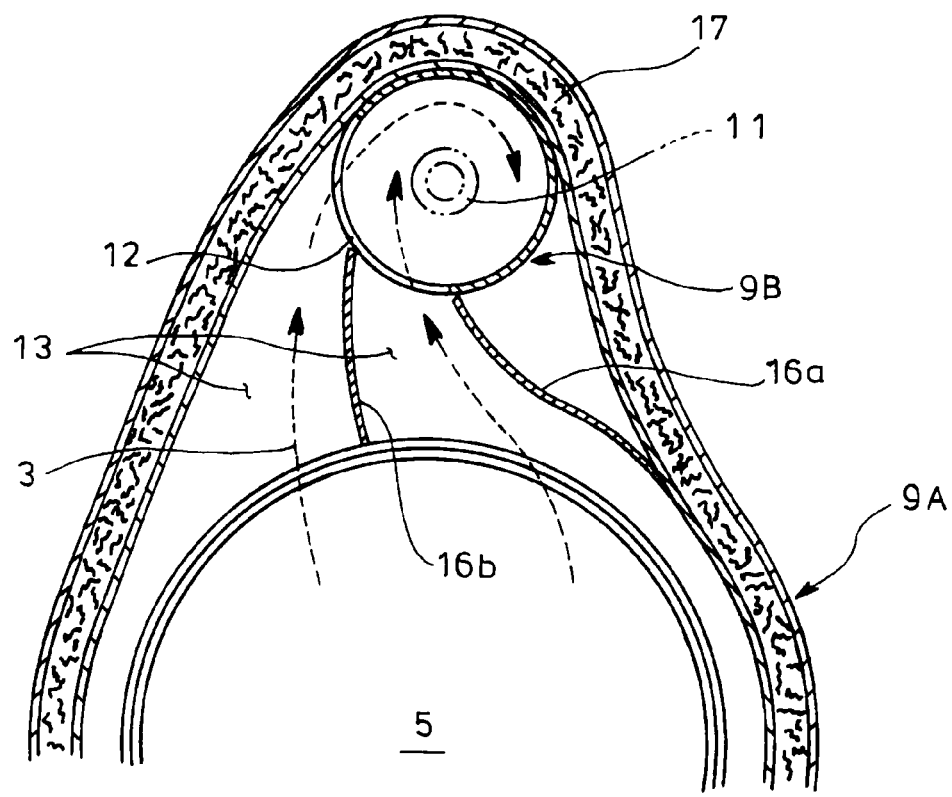
FIG. 5 is a sectional view looking the device shown in FIG. 4 in a direction opposed to the entry end of the mixing pipe.

It is similar to the conventional structure proposed by the inventor and shown in FIGS. 4 and 5 that a urea water addition injector 11 is coaxially fitted to the entry end of the mixing pipe 9B so as to add the urea water axially of the entry end of the mixing pipe 9B.

With the exhaust emission control device thus constructed, the exhaust gas 3 from the discharge end of the particulate filter 5 is gathered in the gas gathering chamber 9A through substantially perpendicular turnabout of the gas and is extracted by the mixing pipe 9B again through substantially perpendicular turnabout of the gas. In this case, the exhaust gas 3 is tangentially introduced into the opening 12 formed on the entry end of the mixing pipe 9B to make a swirling flow in the mixing pipe 9B, so that when the urea water is added axially of the entry end of the mixing pipe 9B, dispersion of the urea water and collision of the urea water against the inner periphery of the mixing pipe 9B are facilitated by the swirling flow; as a result, mist particles of the urea water is effectively miniaturized and early decomposed into ammonia and carbon dioxide gas.

Moreover, the portions other than the opening 12 on the entry end of the mixing pipe 9B are surrounded by the heat-retention chamber 18 to remarkably suppress heat release to outside, so that the inner periphery of the entry end of the mixing pipe 9B is kept high-temperatured and the colliding urea water is prevented from depositing as solid urea without decomposition into ammonia.

Thus, according to the above embodiment, a swirling flow is effectively formed in the entry end of the mixing pipe 9B and the urea water is added to the swirling flow formed, which facilitates dispersion of the urea water and facilitates collision of the urea water against the inner periphery of the mixing pipe 9B; as a result, mist particles of the urea water can be effectively miniaturized and early decomposed into ammonia and carbon dioxide gas. Moreover, without the outer periphery of the discharge end of the gas gathering chamber 9A being covered with heat-insulating material such as glass wool, only by ensuring the extra space isolated from the gas guide passages in the gas gathering chamber 9A as the heat-retention chamber 18 surrounding the entry end of the mixing pipe 9B, the inner periphery of the entry end of the mixing pipe can be kept high-temperatured and the colliding urea water can be favorably decomposed into ammonia without deposition as solid urea; as a result, the use of costly heat-retention structure using costly heat-insulating material such as glass wool can be eliminated to attain substantial lessening in production cost.

Figure 8:
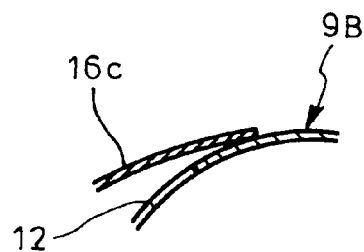
FIG. 8 is an enlarged view showing a step formed by attachment of the guide fin to the edge of the opening.

In the aforementioned illustration shown in FIGS. 6 and 7, the mostdownstream guide fin 16c is attached as separate part to the mostdownstream edge of the opening 12. In this case, as shown in FIG. 8 in enlarged scale, a step is formed by attachment of the guide fin 16c to the edge of the opening 12, so that it is feared that a degree of step is varied in association with the deviation in assembling accuracy and therefore affection on the flow of the exhaust gas 3 is varied to produce deviations on performance such as swirling flow strength and/or exhaust resistance. In order to overcome this, as shown in FIG. 9, the entry end of the mixing pipe 9B may be circumferentially cut in to provide a U-shaped notch line x, an rectangular portion defined by the notch line x being bent radially outward to provided the opening 12 as shown in FIG. 10 on the entry end of the mixing pipe 9B, the bent rectangular portion being employed as a mostdownstream guide fin 16c for tangential introduction of the exhaust gas 3 from the discharge side of the particulate filter 5 to the opening 12.

Specifically, in this manner, the step formed by attachment of the mostdownstream guide fin 16c as separate part to the edge of the opening 12 is eliminated and the guide surface of the mostdownstream guide fin 16c is made contiguous with the inner periphery of the mixing pipe 9B, so that deviations on performance such as swirling flow strength and/or exhaust resistance associated with deviation of assembling accuracy are lessened. Assembling efficiency is also enhanced in comparison with a case where the fin is attached as separate part.

Figure 9:
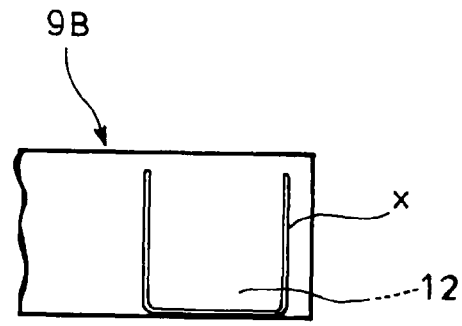
FIG. 9 is a side view showing a notch line cut in on the entry end of the mixing pipe.
Figure 10:
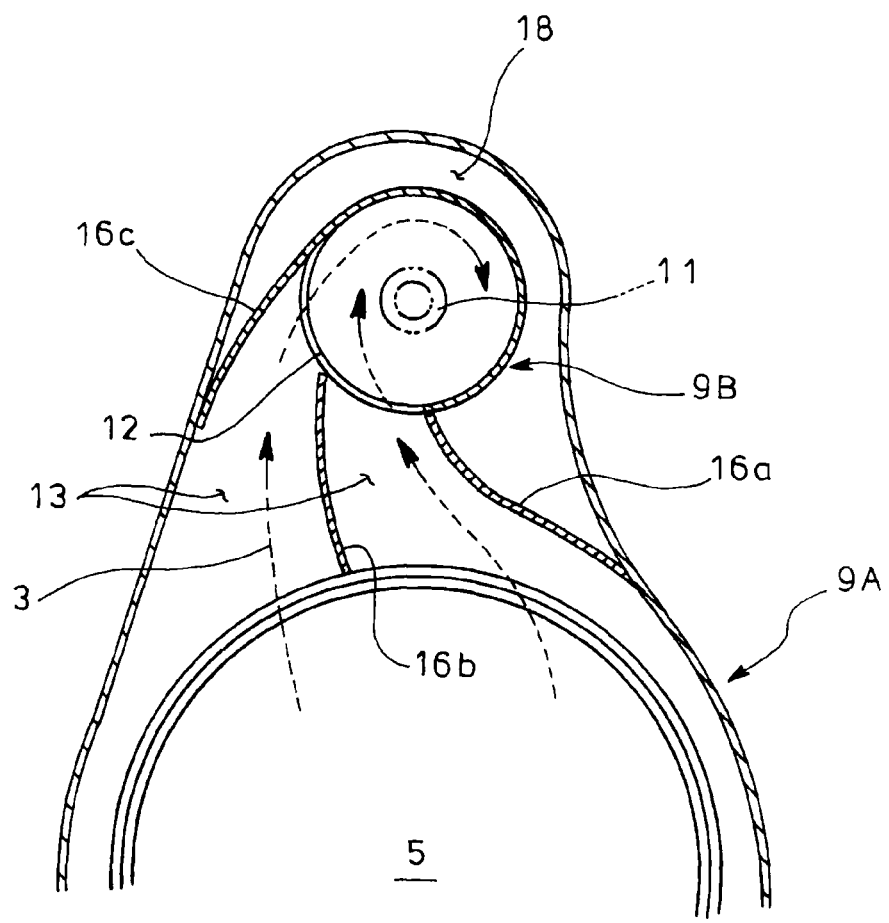
FIG. 10 is a sectional view showing a further embodiment of the invention.

Thus, according to such embodiment shown in FIGS. 9 and 10, the step formed by attachment of the mostdownstream guide fin 16c as separate part to the edge of the opening 12 can be eliminated and the guide surface of the mostdownstream guide fin 16c can be made contiguous with the inner periphery of the mixing pipe 9B, so that deviation on performance such as swirling flow strength and/or exhaust resistance associated with deviation in assembling accuracy can be lessened. Assembling efficiency can be also enhanced in comparison with a case where the mostdownstream guide fin 16c is attached as separate part to the edge of the opening 12.

It is to be understood that an exhaust emission control device of the invention is not limited to the above embodiments and that various changes and modifications may be made without departing from the scope of the invention. For example, illustrated in the embodiments is a case where the exhaust gas gathered in the gas gathering chamber is extracted by the mixing pipe in a direction reverse to the flow of the exhaust in the particulate filter; however, the invention is also applicable to a structure where the exhaust gas gathered in the gas gathering chamber is extracted by the mixing pipe in a direction same as the flow of exhaust in the particulate filter.

The invention claimed is:

1. An exhaust emission control device comprising a particulate filter, a selective reduction catalyst arranged downstream of the particulate filter and capable of selectively reacting $NO_x$ with ammonia even in the presence of oxygen and a communication passage for introduction of exhaust gas from a discharge side of the particulate filter to an entry side of the selective reduction catalyst, an upstream portion of said communication passage being constituted by a gas gathering chamber for surrounding a discharge end of the particulate filter to gather the exhaust gas from said discharge end through perpendicular turnabout of the gas and a mixing pipe for extracting the gathered exhaust gas from said gas gathering chamber again through perpendicular turnabout of the gas, urea water being addible axially of the entry end of the mixing pipe, wherein a discharge end of the gas gathering chamber is connected to the entry end of the mixing pipe so as to encase the entry end of the mixing pipe and close an opened end face of said entry end in a spaced-apart relationship, an opening being formed at a position of the entry end of said mixing pipe adjacent to the discharge side of the particulate filter, gas guide passages for tangential introduction of all of the exhaust gas from the discharge side of the particulate filter to said opening being formed in said gas gathering chamber by guide fins, an extra space isolated from said gas guide passages being ensured in said gas gathering chamber as a heat-retention chamber surrounding the entry end of the mixing pipe.

2. An exhaust emission control device as claimed in claim 1, wherein the entry end of the mixing pipe is circumferentially cut in to provide a U-shaped notch line and a rectangular portion defined by the notch line is bent radially outward to provide the opening, the bent rectangular portion being employed as mostdownstream guide fin for tangential introduction of the exhaust gas from the discharge side of the particulate filter to the opening.

* * * * *